United States Patent [19]
Kessler

[11] Patent Number: 5,047,890
[45] Date of Patent: Sep. 10, 1991

[54] DIFFERENTIAL CURRENT PROTECTION CIRCUITS

[75] Inventor: Leland L. Kessler, American Township, Allen County, Ohio

[73] Assignee: Westinghouse Electric Corp., Pittsburgh, Pa.

[21] Appl. No.: 491,764

[22] Filed: Mar. 12, 1990

[51] Int. Cl.$^5$ .............................................. H02H 3/28
[52] U.S. Cl. .......................................... 361/93; 361/87
[58] Field of Search ..................... 361/93, 45, 46, 91, 361/87

[56] References Cited

U.S. PATENT DOCUMENTS

| | | | |
|---|---|---|---|
| 3,294,976 | 12/1966 | Tipton et al. | 307/57 |
| 3,539,820 | 11/1970 | Kessler | 307/87 |
| 3,683,199 | 8/1972 | Billings et al. | 307/87 |
| 3,748,493 | 7/1973 | Billings et al. | 307/19 |
| 4,173,774 | 11/1979 | Hyvarinen et al. | 361/87 |

Primary Examiner—A. D. Pellinen
Assistant Examiner—C. Schultz
Attorney, Agent, or Firm—R. P. Lenart

[57] ABSTRACT

A differential protection circuit includes a pair of current transformers each having a secondary winding and each being inductively coupled to a power conductor at a different location. The secondary windings of these transformers are electrically connected in series with each other in a loop in a bucking arrangement. A resistor is connected in parallel with the secondary winding of each transformer. Control circuits are connected to sense a voltage signal appearing across the resistor and to take appropriate action when the sensed voltage reaches a predetermined level. An additional winding on one of the transformers provides isolation between the loop and one of the control circuits to prevent false tripping of the differential protection circuit.

7 Claims, 1 Drawing Sheet

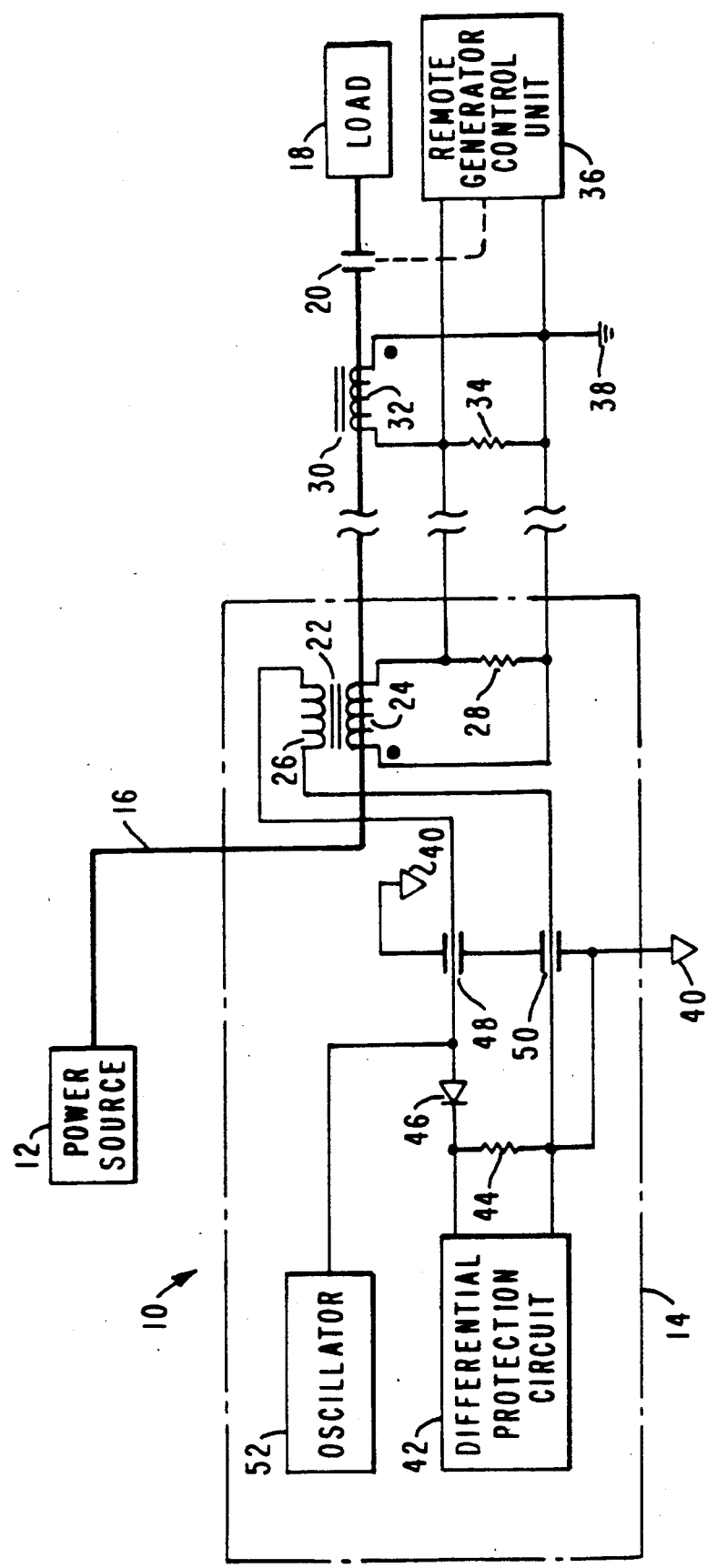

DIFFERENTIAL CURRENT PROTECTION CIRCUITS

BACKGROUND OF THE INVENTION

This invention relates generally to control circuits for use in combination with electric power systems, and particularly, to such control circuits which respond to a difference in current flow at different locations along a power conductor.

Constant speed drive electric power systems which are typically found on commercial aircraft, couple an electric generator to the aircraft engine through a hydromechanical transmission which drives the generator at a constant speed to produce a constant frequency output voltage. Variable speed constant frequency (VSCF) power systems include a generator which is directly coupled to the engine and therefore driven at variable speeds. The variable frequency output of this generator is electronically converted to a constant frequency output. It is desirable to retrofit existing constant speed drive equipped aircraft with variable speed constant frequency power systems. A key to successful retrofit lies in the design of a VSCF system which is directly interchangeable with the existing constant speed drive system. This precludes aircraft wiring changes or changes in any of the other system components. To accomplish this objective, the VSCF converter and its controls must be in the same package as the generator and a remote generator control unit is positioned closer to the system loads.

Differential protection circuits which monitor current at different locations in a power system and produce a control signal for de-exciting the voltage generating source when the difference in currents exceeds some predetermined value, are well known in the art. Typical differential protection circuits contain two current transformers which respond to electric current in a power conductor and are connected in a loop. At least one burden resistor is connected across the current transformers and the polarity of the voltage developed across the transformers is such that if the same current flows through both transformers, no voltage is developed across the burden resistor. If a fault occurs on the power conductor between the two transformers, a voltage is developed across the burden resistor. A control circuit detects the presence of this voltage and takes appropriate action by, for example, disabling the power source or disconnecting the power conductor from the load.

A differential protection circuit for use in a VSCF aircraft power system that is used to replace a constant speed drive system must sense faults at both the VSCF system and the remote generator control unit. This sensing is complicated by the fact that the ground potential near the VSCF system may be different from the ground potential near the remote generator control unit because of common mode voltage in the aircraft structure. In addition, very high voltages can be introduced in the aircraft structure as a result of a lightning strike. It is therefore desirable to devise a differential protection circuit which can function in a VSCF system that is used to replace a constant speed drive system.

SUMMARY OF THE INVENTION

A differential protection circuit constructed in accordance with this invention includes a pair of current transformers each having a secondary winding and being inductively coupled to a power conductor in the power system. The secondary windings are electrically connected in a loop in series with each other in a bucking arrangement. A resistor is electrically connected in parallel with each of the secondary windings. Control circuits are connected to receive a voltage signal developed across the resistor when a difference in current is sensed by the current transformers. One of the control circuits is isolated from the current transformer loop by using a separate winding on one of the current transformers. This eliminates false tripping that may result from a difference in potential of the system ground at the VSCF location and the system ground at the remote generator control unit location.

BRIEF DESCRIPTION OF THE DRAWING

The invention will become more readily apparent from the following description of the preferred embodiment thereof, shown by way of example only, in the accompanying drawing, wherein the single figure is a schematic diagram of a differential protection circuit constructed in accordance with the present invention.

DESCRIPTION OF THE PREFERRED EMBODIMENTS

As shown in the drawing, a VSCF power system generally designated as item 10 comprises a power source 12, which includes a variable speed generator and converter for converting the generator output to a constant frequency AC output, and a generator control unit 14. Typical generator control units contain other circuits which are not related to this invention and are therefore not shown in the drawing. The power source produces a constant frequency AC output voltage on a power conductor 16 in a multiple phase power bus, which is connected to a load 18 through a contactor 20. A local, or first, current transformer 22 is positioned near the power source to sense current in one of the conductors in the power bus 16, the current transformer includes a first secondary winding 24 and a second secondary winding 26. A first burden resistor 28 is connected across the secondary winding 24 of transformer 22. A second current transformer 30 is coupled to the same power conductor as the first current transformer and includes a first secondary winding 32. Burden resistor 34 is electrically connected across the secondary winding of transformer 30. Transformer windings 24 and 32 are electrically connected in series in a loop in a bucking arrangement such that if the same current flows in the power conductor, no voltage is produced across burden resistors 28 and 34. However, if a fault should occur between the current transformers, a voltage would be developed across the burden resistors. The voltage produced across resistor 34 would be sensed by a remote generator control unit 36, which includes control circuits constructed in accordance with known techniques, that would take appropriate action such as opening contactor 20 to remove the load from the power bus.

Since the remote ground 38 may be at a potential which differs from the potential of the local ground 40, isolation is required between the differential protection circuit in the remote generator control unit 36 and the differential protection circuit 42 in the local generator control unit of the VSCF system. This isolation is provided by transformer winding 26. An additional resistor 44 and a diode 46 are electrically connected across winding 26. The diode converts an AC signal from winding 26 to a half wave DC signal for the sensing circuit in control unit 14. Feed-through capacitors 48 and 50 are positioned in an electromagnetic shield around the generator control unit 14.

To minimize the effects of resistor 44, its resistance is significantly greater, for example, more than 100 times greater, than the resistance of resistor 28. Assuming that an equal number of turns is used to construct windings 24, 26 and 32, the voltage developed across winding 26 is equal to the voltage across resistor 28 plus the IR drop in winding 24. Thus, as the resistance of winding 24 is reduced, the voltage across the added winding approaches the voltage across the resistor 28. An analysis of the circuit has shown that for an acceptable worst case IR drop in winding 24 and the highest anticipated current in the power conductor, false tripping of the differential protection circuit 42 would not occur.

Since the differential protection loop provides a fast disconnect function to remove the VSCF system from the power bus, it can be used to provide the disconnect function when it is desired for a reason other than a fault occurring between the current transformers. For this reason, an oscillator 52, which may be formed by using an existing microprocessor in the generator control unit to drive a transformer, is used to produce an AC signal at, for example, 12 kilohertz to cause the differential protection circuit in the remote generator control unit to trip the contactor 20. The 12 kilohertz frequency was chosen to be high enough to reduce the size of a transformer in the oscillator, yet low enough so that high frequency semiconductors are not required.

By using a second winding on transformer 22 to provide isolation between generator control unit 14 and the differential protection loop, the present invention avoids the use of a separate isolation transformer or other isolation devices such as differential amplifiers or optical couplers.

Although the present invention has been described in terms of what are at present believed to be its preferred embodiments, it will be apparent to those skilled in the art that various changes may be made without departing from the scope of the invention. For example, although two burden resistors, 28 and 34, are used in the differential protection loop of the preferred embodiment, these resistors could be replaced with a single burden resistor having equivalent resistance. If resistors 28 and 34 are each 800 ohms, they could be replaced with a single 400 ohm resistor. It is therefore intended that the appended claims cover such changes.

I claim:

1. A differential protection circuit comprising:
   a first current transformer having a first winding inductively coupled to a power conductor at a first location;
   a second current transformer having a first winding inductively coupled to said power conductor at a second location spaced from said first location;
   said first windings of said first and second current transformers being electrically connected in a loop in series with each other in a bucking arrangement;
   a first resistor electrically connected in parallel with said first windings of said first and second current transformers;
   a first control means for disabling an electric circuit in response to a first voltage signal across said first resistor;
   a second winding on said first current transformer; and
   a second control means for disabling said electric circuit in response to a second voltage signal across said second winding.

2. A differential protection circuit, as recited in claim 1, further comprising:
   a second resistor and a diode electrically connected in series with each other to form a circuit branch which is connected across said second winding on said first current transformer, said second control means being connected across said second resistor.

3. A differential protection circuit, as recited in claim 2, wherein the resistance of said second resistor is significantly greater than the resistance of said first resistor.

4. A differential protection circuit, as recited in claim 1, wherein the number of turns in said first winding of said first current transformer is equal to the number of turns in said second winding of said first current transformer.

5. A differential protection circuit, as recited in claim 1, wherein the number of turns in said first winding of said first current transformer is equal to the number of turns in said first winding of said second current transformer.

6. A differential protection circuit, as recited in claim 1, wherein said second control means comprises:
   means for delivering an AC signal to said second winding.

7. A differential protection circuit, as recited in claim 1, further comprising:
   a second resistor electrically connected in parallel with said first resistor.

* * * * *